US010140023B2

(12) United States Patent
Jung

(10) Patent No.: US 10,140,023 B2
(45) Date of Patent: Nov. 27, 2018

(54) MEMORY DEVICE AND MEMORY SYSTEM INCLUDING THE SAME

(71) Applicant: SAMSUNG ELECTRONICS CO., LTD., Suwon-si, Gyeonggi-do (KR)

(72) Inventor: Bong-Kil Jung, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 122 days.

(21) Appl. No.: 15/075,218

(22) Filed: Mar. 21, 2016

(65) Prior Publication Data

US 2017/0031594 A1 Feb. 2, 2017

(30) Foreign Application Priority Data

Jul. 27, 2015 (KR) ........................ 10-2015-0105624

(51) Int. Cl.
*G06F 3/06* (2006.01)

(52) U.S. Cl.
CPC ............ *G06F 3/061* (2013.01); *G06F 3/0659* (2013.01); *G06F 3/0688* (2013.01)

(58) Field of Classification Search
CPC ........ G06F 3/0659; G06F 3/061; G06F 3/067; G06F 3/0688; G06F 11/3485; G06F 12/0246; G06F 2009/45579; G06F 3/0613
See application file for complete search history.

(56) References Cited

U.S. PATENT DOCUMENTS

| | | | | |
|---|---|---|---|---|
| 5,742,801 | A | 4/1998 | Fukushima et al. | |
| 7,230,850 | B2 | 6/2007 | Roohparvar | |
| 7,281,082 | B1 | 10/2007 | Knapp | |
| 7,730,234 | B2 | 6/2010 | Cho | |
| 7,983,753 | B2 * | 7/2011 | Severin | A61N 1/37282 607/30 |
| 8,063,660 | B1 | 11/2011 | Strader et al. | |
| 2006/0179256 | A1 * | 8/2006 | Wongpaisarnsin | G06F 15/167 711/147 |
| 2008/0192547 | A1 | 8/2008 | Roohparvar | |
| 2009/0077301 | A1 | 3/2009 | Brahmadathan et al. | |
| 2010/0322024 | A1 * | 12/2010 | Yagishita | G11C 29/24 365/200 |
| 2013/0212316 | A1 | 8/2013 | Nassie | |

FOREIGN PATENT DOCUMENTS

| | | | |
|---|---|---|---|
| JP | 1996-339298 | A | 12/1996 |
| KR | 2002-0055159 | A | 7/2002 |
| KR | 2007-0002163 | A | 1/2007 |
| KR | 2008-0004875 | A | 1/2008 |
| KR | 2011-0101226 | A | 9/2011 |

* cited by examiner

*Primary Examiner* — Zhuo Li
(74) *Attorney, Agent, or Firm* — Volentine, Whitt & Francos, PLLC

(57) ABSTRACT

A memory device includes memory groups, storing data, and a boosting interface. The boosting interface transfers the data by determining a transfer path of the data based on a command and an access address. The boosting interface includes a reconfigurable input decoder in which a program command of the command is programmed based on a command set mode and an input-output set mode. The memory device has an enhanced performance by programming the program command in the reconfigurable input decoder based on the command set mode and the input-output set mode.

14 Claims, 14 Drawing Sheets

MEMORY DEVICE AND MEMORY SYSTEM INCLUDING THE SAME

CROSS-REFERENCE TO RELATED APPLICATION

This application claims priority under 35 USC § 119 to Korean Patent Application No. 10-2015-0105624, filed on Jul. 27, 2015 in the Korean Intellectual Property Office (KIPO), the contents of which are herein incorporated by reference in their entirety.

BACKGROUND

1. Technical Field

Example embodiments relate generally to a semiconductor device and more particularly to a memory device and a memory system including the memory device.

2. Discussion of the Related Art

According to development of manufacturing techniques of semiconductor devices, a memory device is being developed to have higher performance and higher speed. For higher performance and higher speed, various researches are in progress.

SUMMARY

Some example embodiments provide a memory device having an enhanced performance by programming a program command in a reconfigurable input decoder based on a command set mode and an input-output set mode.

Some example embodiments provide a memory system and a computing system including the memory device having an enhanced performance.

According to example embodiments, a memory device includes memory groups configured to store data and a boosting interface configured to transfer the data by determining a transfer path of the data based on a command and an access address. The boosting interface includes a reconfigurable input decoder in which a program command of the command is programmed based on a command set mode and an input-output set mode.

The boosting interface may further include a buffer, configured to transfer the data between the memory groups and a memory controller based on a data output enable signal and a data input enable signal, and a fixed input decoder having a hard-wired circuit in which a fixed command is implemented as hardware.

The reconfigurable input decoder may include a write command decoder, in which a write command of the program command is programmed when the input-output set mode is an input mode, and a read command decoder in which a read command of the program command is programmed when the input-output set mode is an output mode.

The write command decoder may include a write latch in which the write command is programmed and a write comparator configured to provide a write comparison signal by comparing the write command that is programmed in the write latch and the command that is provided from the memory controller.

When the memory controller provides the command set mode and the input mode of the input-output set mode, the write command may be programmed in the write latch.

An enable bit may be further programmed in the write latch, where the enable bit determines whether the write command programmed in the write latch is activated or not.

When the enable bit is a first state and the write comparison signal is a first state, the data input enable signal may be activated. When the enable bit is a second state, the data input enable signal may be deactivated. When the write comparison signal is a second state, the data input enable signal may be deactivated.

The boosting interface may further include an anti-fuse that stores the program command.

When the memory device is powered-on, the program command that is stored in the anti-fuse may be programmed in the reconfigurable input decoder.

The read command decoder may include a read latch in which the read command is programmed and a read comparator configured to provide a read comparison signal by comparing the read command that is programmed in the read latch and the command that is provided from the memory controller.

When the memory controller provides the command set mode and the output mode of the input-output set mode, the read command may be programmed in the read latch.

An enable bit may be further programmed in the read latch, where the enable bit determines whether the read command programmed in the read latch is activated or not.

When the enable bit is a first state and the read comparison signal is a first state, the data output enable signal may be activated. When the enable bit is a second state, the data output enable signal may be deactivated. When the read comparison signal is a second state, the data output enable signal may be deactivated.

According to example embodiments, a memory system includes a memory controller configured to provide a command and an access address, memory groups configured to store data, and a boosting interface configured to transfer the data by determining a transfer path of the data based on the command and the access address. The boosting interface includes a reconfigurable input decoder in which a program command of the command is programmed based on a command set mode and an input-output set mode.

The memory groups may include a three-dimensional memory cell array.

According to example embodiments, a communication interface includes a buffer and a buffer controller. The buffer communicates data between a nonvolatile memory device and a memory controller that controls the operation of the nonvolatile memory. The buffer controller generates a first signal instructing the buffer to communicate the data between the memory controller and the nonvolatile memory device when reconfigurable information stored by the buffer controller corresponds to a command received by the buffer controller from the memory controller.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
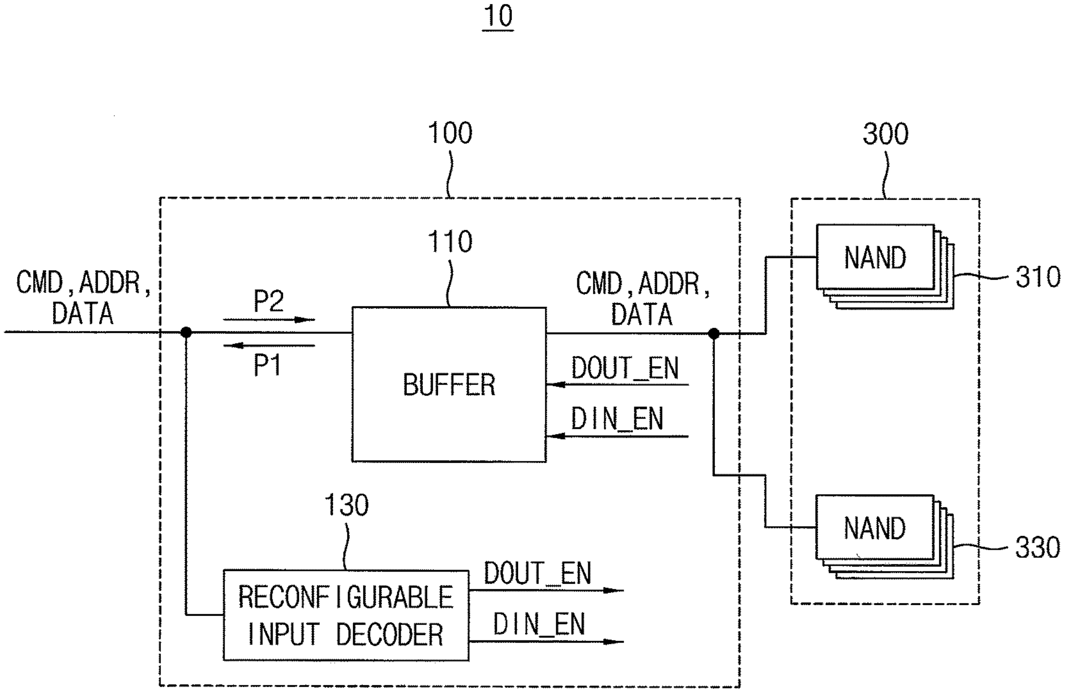
FIG. 1 is a block diagram illustrating a memory device according to an example embodiment.

Various example embodiments will be described more fully hereinafter with reference to the accompanying drawings, in which some example embodiments are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
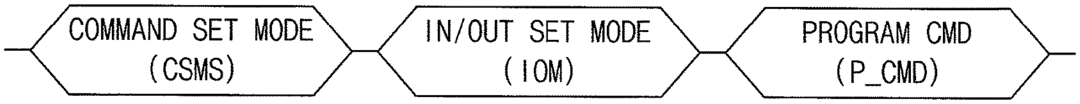
FIG. 2 is a diagram for describing an operation of the memory device of FIG. 1.

FIG. 1 is a block diagram illustrating a memory device according to example embodiments and FIG. 2 is a diagram for describing an operation of the memory device of FIG. 1.

Referring to FIGS. 1 and 2, a memory device 10 includes memory groups 300 storing data DATA and a boosting interface 100. The boosting interface 100 includes a reconfigurable input decoder 130 and a buffer 110. For example the memory groups 300 may include a first memory group 310 and a second memory group 330. The first memory group 310 may include a plurality of memory cell arrays and the second memory group 330 may include a plurality of memory cell arrays. The plurality of memory cell arrays may include flash memory cells.

A program command P_CMD among the command CMD is programmed in the reconfigurable input decoder 130 based on a command set mode CSMS and an input-output set mode IOM. For example, a memory controller 15 may provide the command set mode CSMS and the input-output set mode IOM. In case the memory controller 15 provides the command set mode CSMS and the input-output set mode IOM, the memory controller 15 may program the program command P_CMD in the reconfigurable input decoder 130.

The boosting interface 100 transfers the data DATA by determining a transfer path of the data DATA based on a command CMD and an access address ADDR. For example, the reconfigurable input decoder 130 may provide a data output enable signal DOUT_EN and a data input enable signal DIN_EN by comparing the program command P_CMD that is programmed in the reconfigurable input decoder 130 and the command CMD that is provided from the memory controller 15. In an example embodiment, the data output enable signal DOUT_EN that is provided from the reconfigurable input decoder 130 may be enabled. In case the data output enable signal DOUT_EN that is provided from the reconfigurable input decoder 130 is enabled, the transfer path of the data DATA may be a first path P1. In case the transfer path of the data DATA is the first path P1, the data DATA may be transferred from the memory groups 300 to the memory controller 15. In an example embodiment, the data input enable signal DIN_EN that is provided from the reconfigurable input decoder 130 may be enabled. In case the data input enable signal DIN_EN that is provided from the reconfigurable input decoder 130 is enabled, the transfer path of the data DATA may be a second path P2. In case the transfer path of the data DATA is the second path P2, the data DATA may be transferred from the memory controller 15 to the memory groups 300. The buffer 110 may transfer the data DATA between the memory groups 300 and the memory controller 15 based on the data output enable signal DOUT_EN and the data input enable signal DIN_EN.

The memory device 10 according to example embodiments may increase performance by programming the program command P_CMD in the reconfigurable input decoder 130 based on the command set mode CSMS and the input-output set mode IOM.

Figure 3:
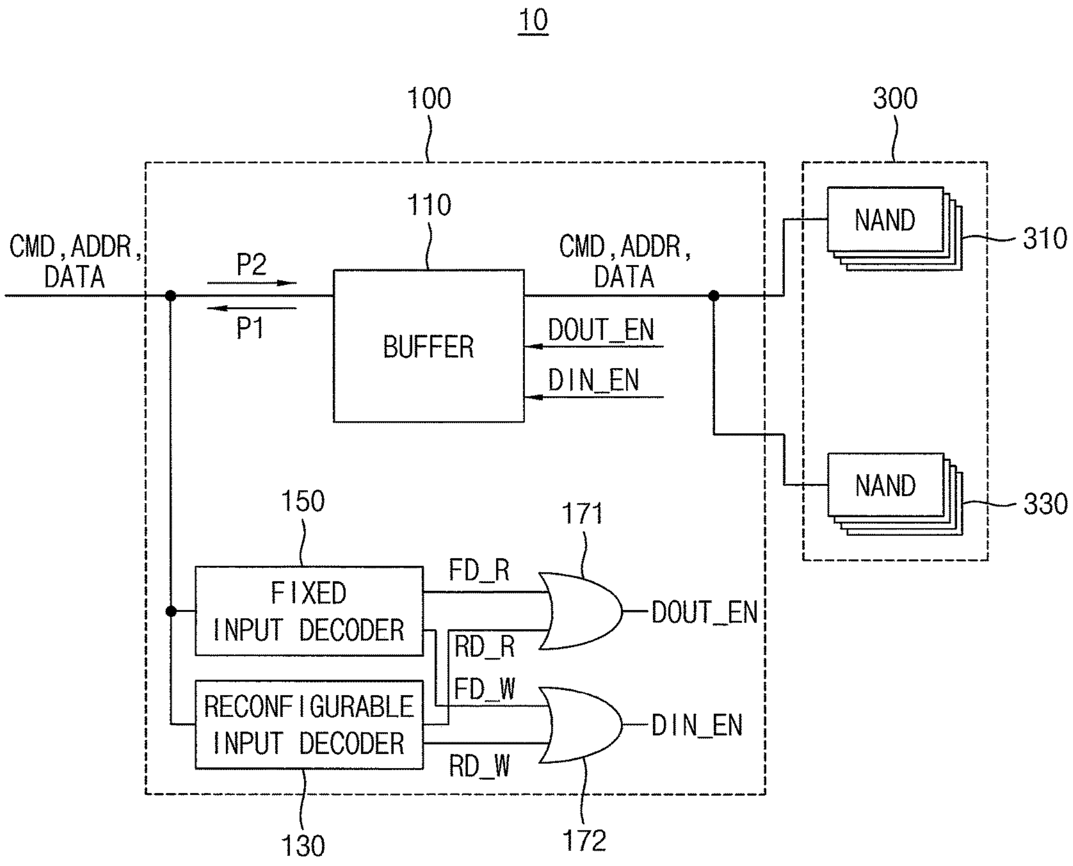
FIG. 3 is a diagram illustrating a memory device according to an example embodiment.
Figure 4:
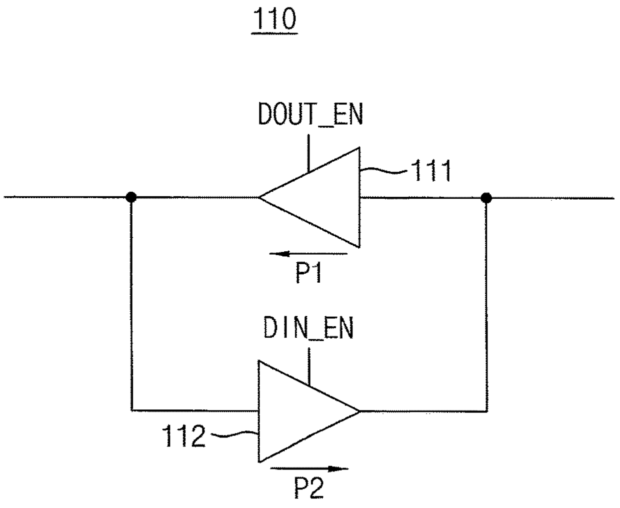
FIG. 4 is a diagram illustrating an example of a buffer included in the memory device of FIG. 3.

FIG. 3 is a diagram illustrating a memory device according to an example embodiment and FIG. 4 is a diagram illustrating an example of a buffer included in the memory device of FIG. 3.

Referring to FIGS. 3 and 4, a memory device 10 includes memory groups 300 and a boosting interface 100. The boosting interface 100 may include a buffer 110, a fixed input decoder 150 and a reconfigurable input decoder 130. The memory groups 300 store data DATA. The boosting interface 100 transfers the data DATA by determining a transfer path of the data DATA based on a command CMD and an access address ADDR. For example, the command CMD and the access address ADDR may be provided from the memory controller 15. The program command P_CMD of the command CMD is programmed in the reconfigurable input decoder 130 based on a command set mode CSMS and an input-output set mode IOM.

The buffer 110 may transfer the data DATA between the memory groups 300 and a memory controller 15 based on a data output enable signal DOUT_EN and a data input enable signal DIN_EN. For example, the buffer 110 may include a first buffer 111 and a second buffer 112.

The first buffer 111 may be enabled based on the data output enable signal DOUT_EN. In case the data output enable signal DOUT_EN is enabled, the first buffer 111 may be enabled. In case the first buffer 111 is enabled, the transfer path of the data DATA may be the first path P1. In case the transfer path of the data DATA is the first path P1, the data DATA may be transferred from the memory groups 300 to the memory controller 15. In addition, in case the data output enable signal DOUT_EN is disabled, the first buffer 111 may be disabled. In case the first buffer 111 is disabled, the data DATA may not be transferred from the memory groups 300 to the memory controller 15.

The second buffer 112 may be enabled based on the data input enable signal DIN_EN. In case the data input enable signal DIN_EN is enabled, the second buffer 112 may be enabled. In case the second buffer 112 is enabled, the transfer path of the data DATA may be the second path P2. In case the transfer path of the data DATA is the second path P2, the data DATA may be transferred from the memory controller 15 to the memory groups 300. In addition, in case the data input enable signal DIN_EN is disabled, the second buffer 112 may be disabled. In case the second buffer 112 is disabled, the data DATA may not be transferred from the memory controller 15 to the memory groups 300.

The output of the fixed input decoder 150 may include a fixed decoder read signal FD_R and a fixed decoder write signal FD_W. For example, in case the read command CMD_R that is stored in the fixed input decoder 150 is equal to the command CMD that is provided from the memory controller 15, the fixed decoder read signal FD_R may be enabled. In addition, in case the write command CMD_W that is stored in the fixed input decoder 150 is equal to the command CMD that is provided from the memory controller 15, the fixed decoder write signal FD_W may be enabled.

The output of the reconfigurable input decoder 130 may include a reconfigurable decoder read signal RD_R and a reconfigurable decoder write signal RD_W. For example, in case the read command CMD_R that is stored in the reconfigurable input decoder 130 is equal to the command CMD that is provided from the memory controller 15, the reconfigurable decoder read signal RD_R may be enabled. In addition, in case the write command CMD_W that is stored in the reconfigurable input decoder 130 is equal to the command CMD that is provided from the memory controller 15, the reconfigurable decoder write signal RD_W may be enabled.

The fixed decoder read signal FD_R and the reconfigurable decoder read signal RD_R may be provided to a first OR gate 171. In case the fixed decoder read signal FD_R or the reconfigurable decoder read signal RD_R is enabled, the data output enable signal DOUT_EN may be enabled. In addition, the fixed decoder write signal FD_W and the reconfigurable decoder write signal RD_W may be provided to a second OR gate 172. In case the fixed decoder write signal FD_W or the reconfigurable decoder write signal RD_W is enabled, the data input enable signal DIN_EN may be enabled.

Figure 5:
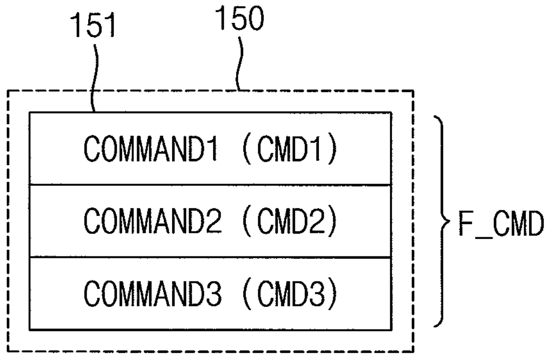
FIG. 5 is a diagram for describing an operation of a fixed input decoder included in the memory device of FIG. 3.
Figure 6:
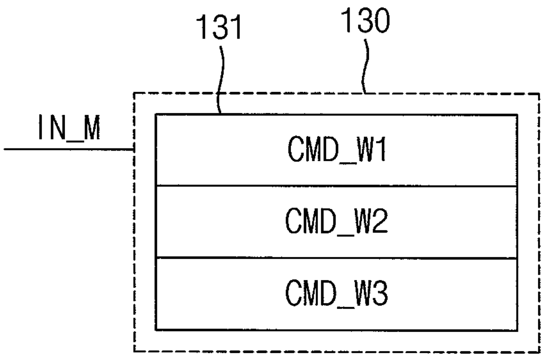
FIGS. 6 and 7 are diagrams for describing an operation of a reconfigurable input decoder included in the memory device of FIG. 3.
Figure 7:
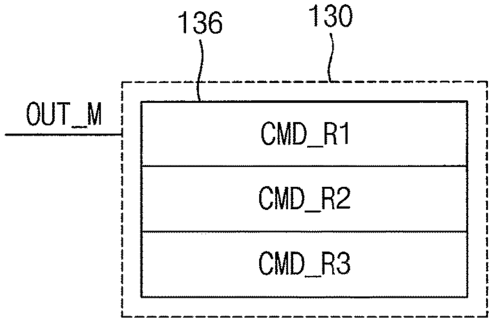

FIG. 5 is a diagram for describing an operation of a fixed input decoder included in the memory device of FIG. 3 and FIGS. 6 and 7 are diagrams for describing an operation of a reconfigurable input decoder included in the memory device of FIG. 3.

Referring to FIGS. 3 and 5 to 7, the boosting interface 100 may include the fixed input decoder 150 and the reconfigurable input decoder 130. In an example embodiment, the fixed input decoder 150 may include a hard wired circuit 151 where a fixed command F_CMD is implemented as hardware. For example, the fixed command F_CMD may include a first command CMD1, a second command CMD2 and a third command CMD3. The first command CMD1 may be implemented in the hard wired circuit 151 as hardware. Because the first command CMD1 is implemented in the hard wired circuit 151 as hardware, the first command CMD1 included in the fixed input decoder 150 may not be reprogrammed. In addition, the second command CMD2 may be implemented in the hard wired circuit 151 as hardware. Because the second command CMD2 is implemented in the hard wired circuit 151 as hardware, the second command CMD2 included in the fixed input decoder 150 may not be reprogrammed. In addition, the third command CMD3 may be implemented in the hard wired circuit 151 as hardware. Because the third command CMD3 is implemented in the hard wired circuit 151 as hardware, the third command CMD3 included in the fixed input decoder 150 may not be reprogrammed.

The reconfigurable input decoder 130 may include a write command decoder 131 and a read command decoder 136. The write command decoder 131 may be programmed by a write command CMD_W of the program command P_CMD when the input-output set mode IOM is an input mode IN_M. For example, the memory controller 15 may provide the command set mode CSMS. After the memory controller 15 provides the command set mode CSMS, the memory controller 15 may provide the input-output set mode IOM. In case the input-output set mode IOM is the input mode IN_M, the write command decoder 131 may be programmed by a write command CMD_W of the program command P_CMD.

The program command P_CMD may be the command CMD that is programmed in the reconfigurable input decoder 130. The write command CMD_W may be used for the write operation of the memory device 10. For example, the write command CMD_W of the program command P_CMD may include the first write command CMD_W1, the second write command CMD_W2 and the third write command CMD_W3. The memory controller 15 may provide the command set mode CSMS. After the memory controller 15 provides the command set mode CSMS, the memory controller 15 may provide the input-output set mode IOM. In case the input-output set mode IOM is the input mode IN_M, the write command decoder 131 may be programmed by the first write command CMD_W1 of the program command P_CMD. After that, the memory controller 15 may provide the command set mode CSMS again. After the memory controller 15 provides the command set mode CSMS, the memory controller 15 may provide the input-output set mode IOM. In case the input-output set mode IOM is the input mode IN_M, the write command decoder 131 may be programmed by the second write command CMD_W2 of the program command P_CMD. After that, the memory controller 15 may provide the command set mode CSMS again. After the memory controller 15 provides the command set mode CSMS, the memory controller 15 may provide the input-output set mode IOM. In case the input-output set mode IOM is the input mode IN_M, the write command decoder 131 may be programmed by the third write command CMD_W3 of the program command P_CMD.

While the memory device 10 operates, an addition of a new command CMD may be required. In case the addition of the new command CMD is required during the operation of the memory device 10, the memory controller 15 may program the program command P_CMD in the reconfigurable input decoder 130 based on the command set mode CSMS and the input-output set mode IOM.

The read command decoder 136 may be programmed by a read command CMD_R of the program command P_CMD when the input-output set mode IOM is an output mode OUT_M. For example, the memory controller 15 may provide the command set mode CSMS. After the memory controller 15 provides the command set mode CSMS, the memory controller 15 may provide the input-output set mode IOM. In case the input-output set mode IOM is the output mode OUT_M, the read command decoder 136 may be programmed by a read command CMD_R of the program command P_CMD.

The program command P_CMD may be the command CMD that is programmed in the reconfigurable input decoder 130. The read command CMD_R may be used for the read operation of the memory device 10. For example, the read command CMD_R of the program command P_CMD may include the first read command CMD_R1, the second read command CMD_R2 and the third read command CMD_R3. The memory controller 15 may provide the command set mode CSMS. After the memory controller 15 provides the command set mode CSMS, the memory controller 15 may provide the input-output set mode IOM. In case the input-output set mode IOM is the output mode OUT_M, the read command decoder 136 may be programmed by the first read command CMD_R1 of the program command P_CMD. After that, the memory controller 15 may provide the command set mode CSMS again. After the memory controller 15 provides the command set mode CSMS, the memory controller 15 may provide the input-output set mode IOM. In case the input-output set mode IOM is the output mode OUT_M, the read command decoder 136 may be programmed by the second read command CMD_R2 of the program command P_CMD. After the memory controller 15 provides the command set mode CSMS, the memory controller 15 may provide the input-output set mode IOM. In case the input-output set mode IOM is the output mode OUT_M, the read command decoder 136 may be programmed by the third read command CMD_R3 of the program command P_CMD.

While the memory device 10 operates, the addition of the new command CMD may be required. In case the addition of the new command CMD is required during the operation of the memory device 10, the memory controller 15 may program the program command P_CMD in the reconfigurable input decoder 130 based on the command set mode CSMS and the input-output set mode IOM.

In an example embodiment, the boosting interface 100 may include a buffer 110 and a fixed input decoder 150. The buffer 110 may transfer the data DATA between the memory groups 300 and a memory controller 15 based on a data output enable signal DOUT_EN and a data input enable signal DIN_EN. The fixed input decoder 150 may include a hard wired circuit 151 where a fixed command F_CMD is implemented as hardware.

The memory device 10 according to example embodiments may increase performance by programming the program command P_CMD in the reconfigurable input decoder 130 based on the command set mode CSMS and the input-output set mode IOM.

Figure 8:
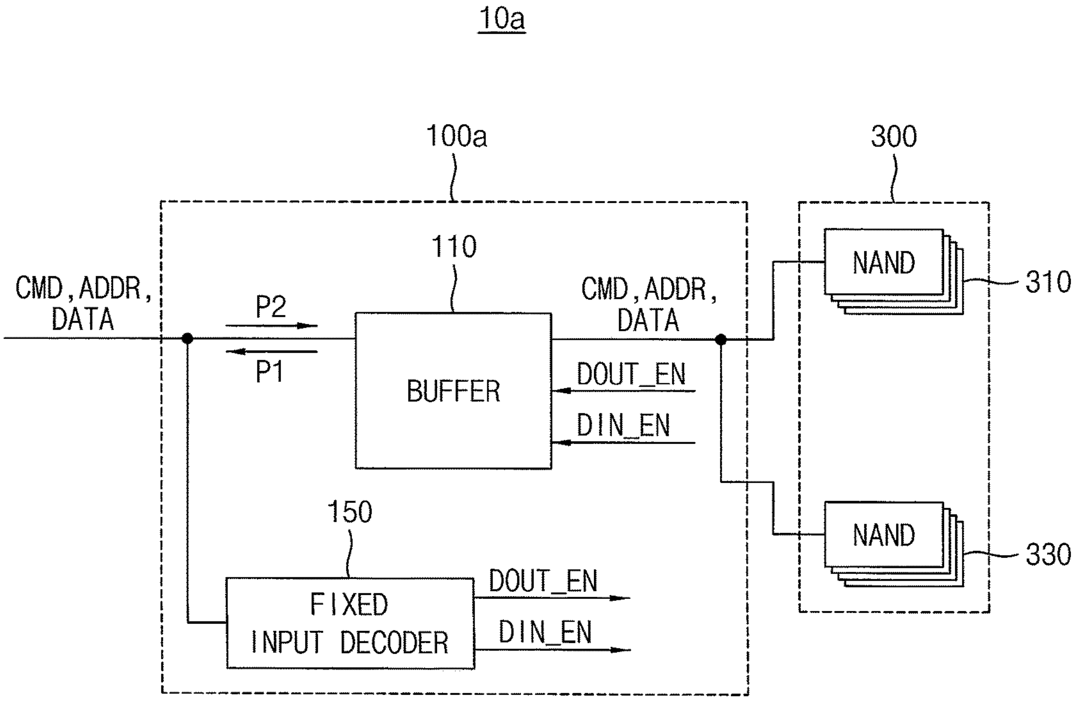
FIG. 8 is a diagram illustrating a memory device including a boosting interface.

FIG. 8 is a diagram illustrating a memory device including a boosting interface.

Referring to FIGS. 4, 5, 6 and 8, a conventional memory device 10*a* includes memory groups 300 and a boosting interface 100*a*. The boosting interface 100*a* may include a buffer 110 and a fixed input decoder 150. The memory groups 300 store data DATA. For example the memory groups 300 may include a first memory group 310 and a second memory group 330. The first memory group 310 may include a plurality of memory cell arrays and the second memory group 330 may include a plurality of memory cell arrays. The plurality of memory cell arrays may include flash memory cells.

The fixed input decoder 150 may include a hard wired circuit 151, such as that illustrated in FIG. 5, where a fixed command F_CMD is implemented as hardware. For example, the fixed command F_CMD may include a first command CMD1, a second command CMD2 and a third command CMD3. The first command CMD1 may be implemented in the hard wired circuit 151 as hardware. Because the first command CMD1 is implemented in the hard wired circuit 151 as hardware, the first command CMD1 included in the fixed input decoder 150 may not be reprogrammed. In addition, the second command CMD2 may be implemented in the hard wired circuit 151 as hardware. Because the second command CMD2 is implemented in the hard wired circuit 151 as hardware, the second command CMD2 included in the fixed input decoder 150 may not be reprogrammed. In addition, the third command CMD3 may be implemented in the hard wired circuit 151 as hardware. Because the third command CMD3 is implemented in the hard wired circuit 151 as hardware, the third command CMD3 included in the fixed input decoder 150 may not be reprogrammed.

The boosting interface 100*a* transfers the data DATA by determining a transfer path of the data DATA based on a command CMD and an access address ADDR. The buffer 110 may transfer the data DATA between the memory groups 300 and a memory controller 15 based on a data output enable signal DOUT_EN and a data input enable signal DIN_EN. For example, the buffer 110 may include a first buffer 111 and a second buffer 112, such as that illustrated in FIG. 4.

For example, the first buffer 111 may be enabled based on the data output enable signal DOUT_EN. The read command CMD_R that is provided from the memory controller 15 may be equal to the first command CMD1. In case the memory controller 15 provides the first command CMD1, the fixed input decoder 150 may enable the data output enable signal DOUT_EN. In case the data output enable signal DOUT_EN is enabled, the first buffer 111 may be enabled. In case the first buffer 111 is enabled, the transfer path of the data DATA may be the first path P1. In case the transfer path of the data DATA is the first path P1, the data DATA may be transferred from the memory groups 300 to the memory controller 15.

In addition, the second buffer 112 may be enabled based on the data input enable signal DIN_EN. The write command CMD_W that is provided from the memory controller 15 may be equal to the second command CMD2. In case the memory controller 15 provides the second command CMD2, the fixed input decoder 150 may enable the data input enable signal DIN_EN. In case the data input enable signal DIN_EN is enabled, the second buffer 112 may be enabled. In case the second buffer 112 is enabled, the transfer path of the data DATA may be the second path P2. In case the transfer path of the data DATA is the second path P2, the data DATA may be transferred from the memory controller 15 to the memory groups 300.

However, because the conventional memory device 10*a* uses only the fixed input decoder 150 including the hard wired circuit 151 where a fixed command F_CMD is implemented as hardware, in case the memory controller 15 provides the first write command CMD_W1 which is not included in the fixed input decoder 150, the conventional memory device 10*a* may not perform the operation corresponding to the first write command CMD_W1. However, in the memory device 10 according to example embodiments, in case the addition of the new command CMD is required during the operation of the memory device 10, the memory controller 15 may program the program command P_CMD in the reconfigurable input decoder 130 based on the command set mode CSMS and the input-output set mode IOM. Therefore, the memory device 10 according to example embodiments may increase the performance by programming the program command P_CMD in the reconfigurable input decoder 130 based on the command set mode CSMS and the input-output set mode IOM.

Figure 9:
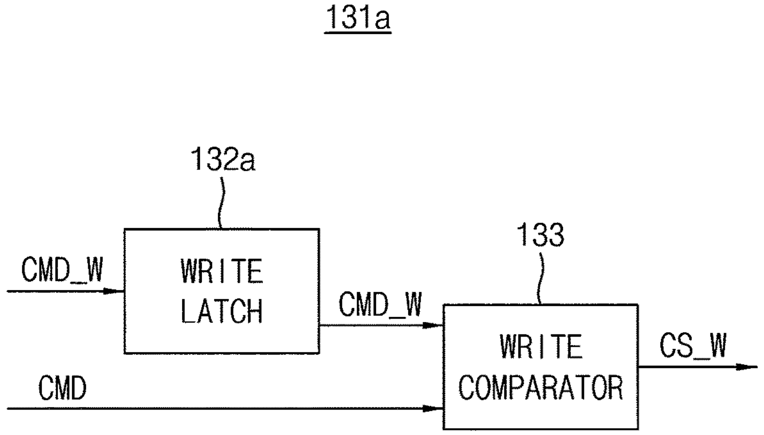
FIG. 9 is a block diagram illustrating an example of a write command decoder included in the reconfigurable input decoder in FIG. 3.

FIG. 9 is a block diagram illustrating an example of a write command decoder included in the reconfigurable input decoder in FIG. 3.

Referring to FIG. 9, the write command decoder 131*a* may include a write latch 132*a* and a write comparator 133. The write latch 132*a* may be programmed by the write command CMD_W. For example, the write command CMD_W of the program command P_CMD may include the first write command CMD_W1, the second write command CMD_W2 and the third write command CMD_W3. The memory controller 15 may provide the command set mode CSMS. After the memory controller 15 provides the command set mode CSMS, the memory controller 15 may provide the input-output set mode IOM. In case the input-output set mode IOM is the input mode IN_M, the memory controller 15 may program the first write command CMD_W1 of the program command P_CMD in the write command decoder 131*a*. After that, the memory controller 15 may provide the command set mode CSMS again. After the memory controller 15 provides the command set mode CSMS, the memory controller 15 may provide the input-output set mode IOM. In case the input-output set mode IOM is the input mode IN_M, the memory controller 15 may program the second write command CMD_W2 of the program command P_CMD in the write command decoder 131*a*. After that, the memory controller 15 may provide the command set mode CSMS again. After the memory controller 15 provides the command set mode CSMS, the memory controller 15 may provide the input-output set mode IOM. In case the input-output set mode IOM is the input mode IN_M, the memory controller 15 may program the third write command CMD_W3 of the program command P_CMD in the write command decoder 131*a*.

The write comparator 133 may provide a write comparison signal CS_W by comparing the write command CMD_W that is programmed in the write latch 132*a* and the command CMD that is provided from the memory controller 15. For example, the command CMD that is provided from the memory controller 15 may be the first write command CMD_W1. In case the command CMD that is provided from the memory controller 15 is the first write command CMD_W1, the write comparator 133 may compare the first write command CMD_W1 that is programmed in the write latch 132*a* and the first write command CMD_W1 that is provided from the memory controller 15. In case the first write command CMD_W1 that is programmed in the write latch 132*a* is equal to the first write command CMD_W1 that is provided from the memory controller 15, the write comparison signal CS_W may be enabled. In case the write comparison signal CS_W is enabled, the reconfigurable decoder write signal RD_W may be enabled. In case the reconfigurable decoder write signal RD_W is enabled, the data input enable signal DIN_EN may be enabled. In case the data input enable signal DIN_EN is enabled, the transfer path of the data DATA may be the second path P2. In case the transfer path of the data DATA is the second path P2, the data DATA may be transferred from the memory controller 15 to the memory groups 300.

For example, the command CMD that is provided from the memory controller 15 may be the third write command CMD_W3. In case the command CMD that is provided from the memory controller 15 is the third write command CMD_W3, the write comparator 133 may compare the third write command CMD_W3 that is programmed in the write latch 132*a* and the third write command CMD_W3 that is provided from the memory controller 15. In case the third write command CMD_W3 that is programmed in the write latch 132*a* is equal to the third write command CMD_W3 that is provided from the memory controller 15, the write comparison signal CS_W may be enabled. In case the write comparison signal CS_W is enabled, the reconfigurable decoder write signal RD_W may be enabled. In case the reconfigurable decoder write signal RD_W is enabled, the data input enable signal DIN_EN may be enabled. In case the data input enable signal DIN_EN is enabled, the transfer path of the data DATA may be the second path P2. In case the transfer path of the data DATA is the second path P2, the data DATA may be transferred from the memory controller 15 to the memory groups 300.

In an example embodiment, in case the memory controller 15 provides the command set mode CSMS and the input mode IN_M of the input-output set mode IOM, the memory controller 15 programs the write command CMD_W in the write latch 132*a*.

Figure 10:
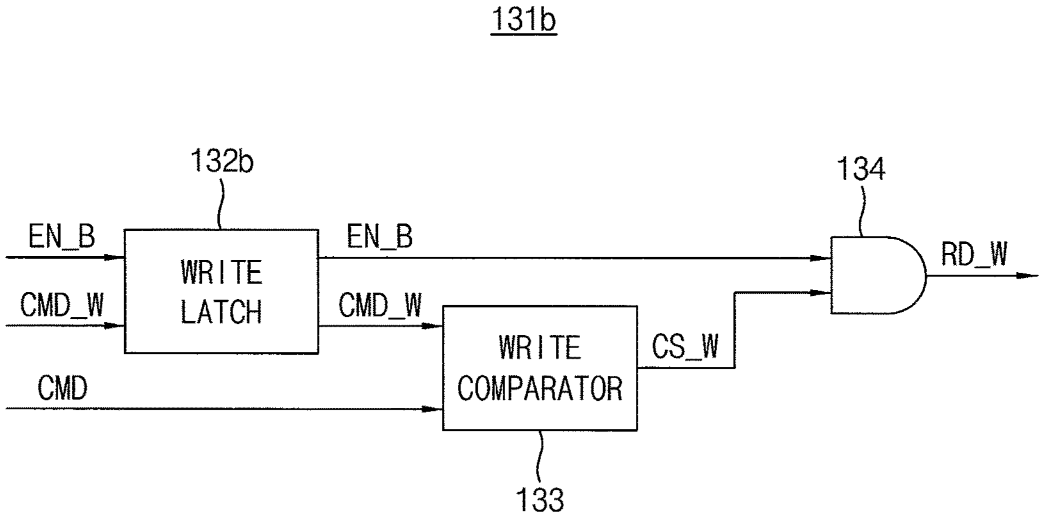
FIG. 10 is a block diagram illustrating another example of a write command decoder included in the reconfigurable input decoder in FIG. 3.

FIG. 10 is a block diagram illustrating another example of a write command decoder included in the reconfigurable input decoder in FIG. 3.

Referring to FIG. 10, the write command decoder 131*b* may include a write latch 132*b*, a write comparator 133 and a first AND gate 134. The write latch 132*b* may be programmed by the write command CMD_W and an enable bit EN_B. For example, the write command CMD_W of the program command P_CMD may include the first write command CMD_W1, the second write command CMD_W2 and the third write command CMD_W3. The memory controller 15 may provide the command set mode CSMS. After the memory controller 15 provides the command set mode CSMS, the memory controller 15 may provide the input-output set mode IOM. In case the input-output set mode IOM is the input mode IN_M, the memory controller 15 may program the first write command CMD_W1 of the program command P_CMD and a first enable bit EN_B1 in the write command decoder 131*b*. After that, the memory controller 15 may provide the command set mode CSMS again. After the memory controller 15 provides the command set mode CSMS, the memory controller 15 may provide the input-output set mode IOM. In case the input-output set mode IOM is the input mode IN_M, the memory controller 15 may program the second write command CMD_W2 of the program command P_CMD and a second enable bit EN_B2 in the write command decoder 131*b*. After that, the memory controller 15 may provide the command set mode CSMS again. After the memory controller 15 provides the command set mode CSMS, the memory controller 15 may provide the input-output set mode IOM. In case the input-output set mode IOM is the input mode IN_M, the memory controller 15 may program the third write command CMD_W3 of the program command P_CMD and a third enable bit EN_B3 in the write command decoder 131*b*.

The write comparator 133 may provide a write comparison signal CS_W by comparing the write command CMD_W that is programmed in the write latch 132*b* and the command CMD that is provided from the memory controller 15. The write comparison signal CS_W and enable bit EN_B may be provided to the first AND gate 134. For example, in case the write comparison signal CS_W is enabled and the enable bit EN_B is '1', the reconfigurable decoder write signal RD_W may be enabled. In addition, in case the enable bit EN_B is '0', the reconfigurable decoder write signal RD_W may be disabled.

In an example embodiment, the memory controller 15 may further program an enable bit EN_B in the write latch 132*b*. The enable bit EN_B may determine whether the write command CMD_W is activated or not. In case the enable bit EN_B is a first state and the write comparison signal CS_W is a first state, the data input enable signal DIN_EN may be activated. The meaning of 'activated' may be equal to the meaning of 'enabled'. For example, in case the enable bit EN_B is a first state, the value of the enable bit EN_B may be '1'. In case the write comparison signal CS_W is a first state, the write comparison signal CS_W is enabled.

In case the enable bit EN_B is a second state, the data input enable signal DIN_EN may be deactivated. The meaning of 'deactivated' may be equal to the meaning of 'disabled'. In case the enable bit EN_B is a second state, the value of the enable bit EN_B may be '0'.

In case the write comparison signal CS_W is a second state, the data input enable signal DIN_EN may be deactivated. For example, in case the write comparison signal CS_W is a second state, the write comparison signal CS_W is disabled.

Figure 11:
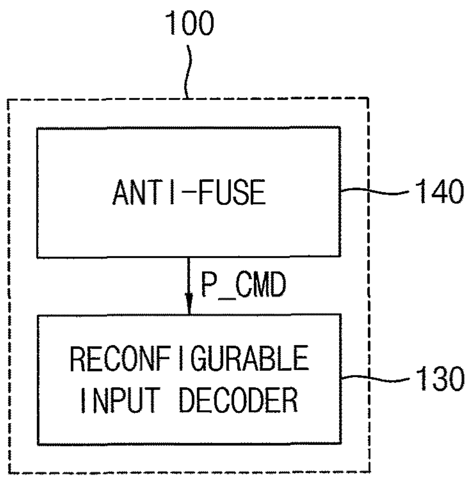
FIG. 11 is a diagram illustrating an example of a boosting interface included in the memory device of FIG. 3.

FIG. 11 is a diagram illustrating an example of a boosting interface included in the memory device of FIG. 3.

Referring to FIGS. 3 and 11, a memory device 10 includes memory groups 300 and a boosting interface 100. The boosting interface 100 may include a buffer 110, a fixed input decoder 150 and a reconfigurable input decoder 130. The memory groups 300 store data DATA. The boosting interface 100 transfers the data DATA by determining a transfer path of the data DATA based on a command CMD and an access address ADDR. For example, the command CMD and the access address ADDR may be provided from the memory controller 15. The program command P_CMD of the command CMD is programmed in the reconfigurable input decoder 130 based on a command set mode CSMS and an input-output set mode IOM.

In an example embodiment, the boosting interface 100 may further include an anti-fuse 140 storing the program command P_CMD. The program command P_CMD may be stored in the anti-fuse 140 before the memory device 10 operates. For example, in case the memory device 10 is powered-on, the program command P_CMD that is stored in the anti-fuse 140 may be programmed in the reconfigurable input decoder 130.

Figure 12:
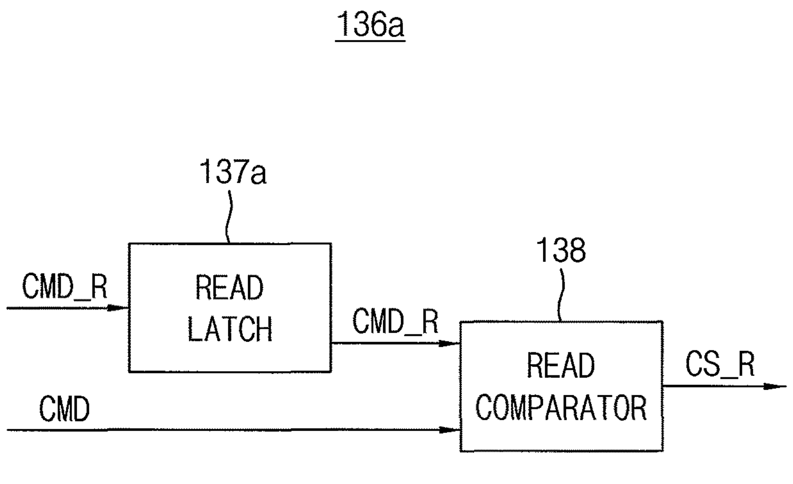
FIG. 12 is a block diagram illustrating an example of a read command decoder included in the reconfigurable input decoder in FIG. 3.

FIG. 12 is a block diagram illustrating an example of a read command decoder included in the reconfigurable input decoder in FIG. 3.

Referring to FIG. 12, a read command decoder 136*a* may include a read latch 137*a* and a read comparator 138. The read latch 137*a* may be programmed by the read command CMD_R. For example, the read command CMD_R of the program command P_CMD may include the first read command CMD_R1, the second read command CMD_R2 and the third read command CMD_R3. The memory controller 15 may provide the command set mode CSMS. After the memory controller 15 provides the command set mode CSMS, the memory controller 15 may provide the input-output set mode IOM. In case the input-output set mode IOM is the output mode OUT_M, the memory controller 15 may program the first read command CMD_R1 of the program command P_CMD in the read command decoder 136*a*. After that, the memory controller 15 may provide the command set mode CSMS again. After the memory controller 15 provides the command set mode CSMS, the memory controller 15 may provide the input-output set mode IOM. In case the input-output set mode IOM is the output mode OUT_M, the memory controller 15 may program the second read command CMD_R2 of the program command P_CMD in the read command decoder 136*a*. After that, the memory controller 15 may provide the command set mode CSMS again. After the memory controller 15 provides the command set mode CSMS, the memory controller 15 may provide the input-output set mode IOM. In case the input-output set mode IOM is the output mode OUT_M, the memory controller 15 may program the third read command CMD_R3 of the program command P_CMD in the read command decoder 136*a*.

The read comparator 138 may provide a read comparison signal CS_R by comparing the read command CMD_R that is programmed in the read latch 137*a* and the command CMD that is provided from the memory controller 15. For example, the command CMD that is provided from the memory controller 15 may be the first read command CMD_R1. In case the command CMD that is provided from the memory controller 15 is the first read command CMD_R1, the read comparator 138 may compare the first read command CMD_R1 that is programmed in the read latch 137*a* and the first read command CMD_R1 that is provided from the memory controller 15. In case the first read command CMD_R1 that is programmed in the read latch 137*a* is equal to the first read command CMD_R1 that is provided from the memory controller 15, the read comparison signal CS_R may be enabled. In case the read comparison signal CS_R is enabled, the reconfigurable decoder read signal RD_R may be enabled. In case the reconfigurable decoder read signal RD_R is enabled, the data output enable signal DOUT_EN may be enabled. In case the data output enable signal DOUT_EN is enabled, the transfer path of the data DATA may be the first path P1. In case the transfer path of the data DATA is the first path P1, the data DATA may be transferred from the memory groups 300 to the memory controller 15.

For example, the command CMD that is provided from the memory controller 15 may be the second read command CMD_R2. In case the command CMD that is provided from the memory controller 15 is the second read command CMD_R2, the read comparator 138 may compare the second read command CMD_R2 that is programmed in the read latch 137*a* and the second read command CMD_R2 that is provided from the memory controller 15. In case the second read command CMD_R2 that is programmed in the read latch 137*a* is equal to the second read command CMD_R2 that is provided from the memory controller 15, the read comparison signal CS_R may be enabled. In case the read comparison signal CS_R is enabled, the reconfigurable decoder read signal RD_R may be enabled. In case the reconfigurable decoder read signal RD_R is enabled, the data output enable signal DOUT_EN may be enabled. In case the data output enable signal DOUT_EN is enabled, the transfer path of the data DATA may be the first path P1. In case the transfer path of the data DATA is the first path P1, the data DATA may be transferred from the memory groups 300 to the memory controller 15.

In an example, embodiment, in case the memory controller 15 provides the command set mode CSMS and the output mode OUT_M of the input-output set mode IOM, the memory controller 15 may program the read command CMD_R in the read latch 137.

Figure 13:
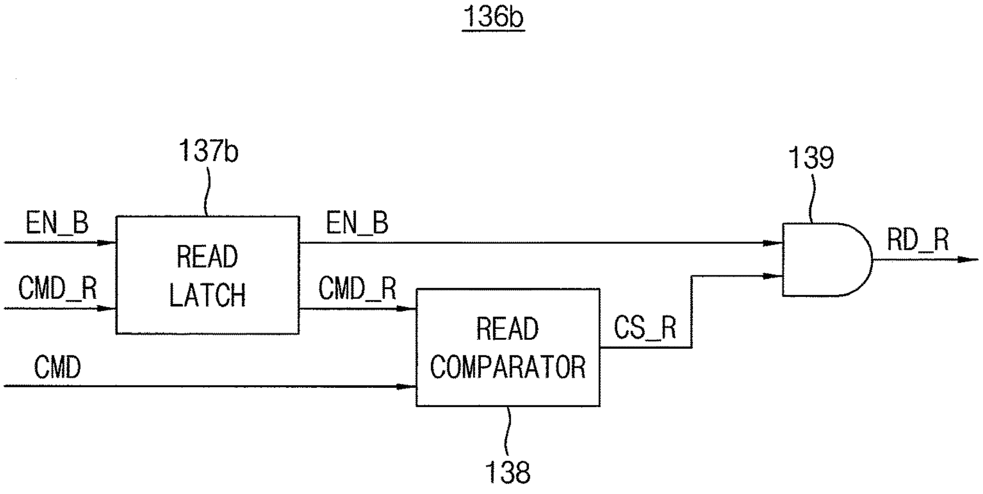
FIG. 13 is a block diagram illustrating another example of a read command decoder included in the reconfigurable input decoder in FIG. 3.
Figure 14:
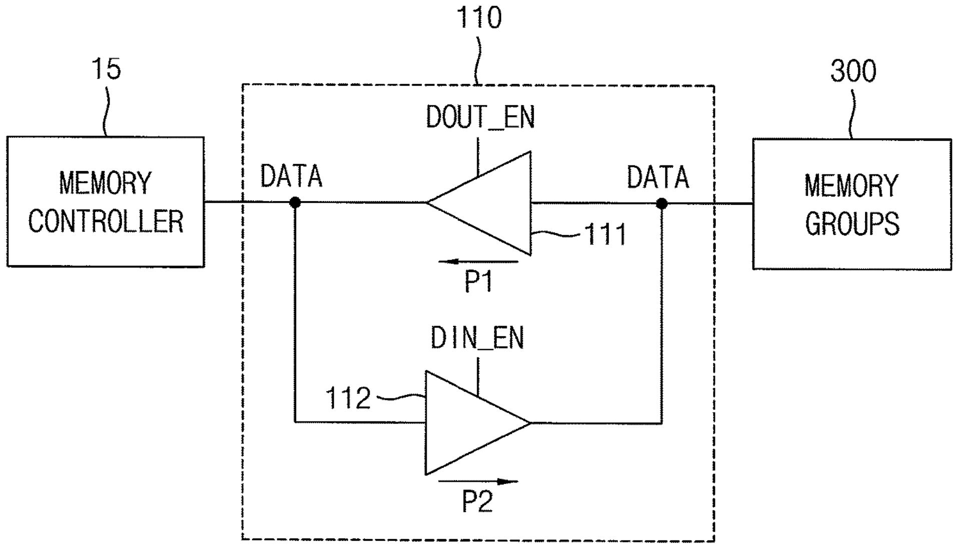
FIG. 14 is a diagram for describing an operation of a buffer included in the memory device of FIG. 3.

FIG. 13 is a block diagram illustrating another example of a read command decoder included in the reconfigurable input decoder of FIG. 3 and FIG. 14 is a diagram for describing an operation of a buffer included in the memory device in FIG. 3.

Referring to FIGS. 13 and 14, the read command decoder 136*b* may include a read latch 137*b*, a read comparator 138 and a second AND gate 139. The read latch 137*b* may be programmed by the read command CMD_R and an enable bit EN_B. For example, the read command CMD_R of the program command P_CMD may include the first read command CMD_R1, the second read command CMD_R2 and the third read command CMD_R3. The memory controller 15 may provide the command set mode CSMS. After the memory controller 15 provides the command set mode CSMS, the memory controller 15 may provide the input-output set mode IOM. In case the input-output set mode IOM is the output mode OUT_M, the memory controller 15 may program the first read command CMD_R1 of the program command P_CMD and a first enable bit EN_B1 in the read command decoder 136*b*. After that, the memory controller 15 may provide the command set mode CSMS again. After the memory controller 15 provides the command set mode CSMS, the memory controller 15 may provide the input-output set mode IOM. In case the input-output set mode IOM is the output mode OUT_M, the memory controller 15 may program the second read command CMD_R2 of the program command P_CMD and a second enable bit EN_B2 in the read command decoder 136*b*. After that, the memory controller 15 may provide the command set mode CSMS again. After the memory controller 15 provides the command set mode CSMS, the memory controller 15 may provide the input-output set mode IOM. In case the input-output set mode IOM is the output mode OUT_M, the memory controller 15 may program the third read command CMD_R3 of the program command P_CMD and a third enable bit EN_B3 in the read command decoder 136*b*.

The read comparator 138 may provide a read comparison signal CS_R by comparing the read command CMD_R that is programmed in the read latch 137*b* and the command CMD that is provided from the memory controller 15. The read comparison signal CS_R and enable bit EN_B may be provided to the second AND gate 139. For example, in case the read comparison signal CS_R is enabled and the enable bit EN_B is '1', the reconfigurable decoder read signal RD_R may be enabled. In addition, in case the enable bit EN_B is '0', the reconfigurable decoder read signal RD_R may be disabled.

In an example embodiment, the memory controller 15 may further program an enable bit EN_B in the read latch 137*b*. The enable bit EN_B may determine whether the read command CMD_R is activated or not. In case the enable bit EN_B is a first state and the read comparison signal CS_R is a first state, the data output enable signal DOUT_EN may be activated. The meaning of 'activated' may be equal to the meaning of 'enabled'. For example, in case the enable bit EN_B is a first state, the value of the enable bit EN_B may be '1'. In case the read comparison signal CS_R is a first state, the read comparison signal CS_R is enabled.

In case the enable bit EN_B is a second state, the data output enable signal DOUT_EN may be deactivated. The meaning of 'deactivated' may be equal to the meaning of 'disabled'. In case the enable bit EN_B is a second state, the value of the enable bit EN_B may be '0'.

In case the read comparison signal CS_R is a second state, the data output enable signal DOUT_EN may be deactivated. For example, in case the read comparison signal CS_R is a second state, the read comparison signal CS_R is disabled.

In case the data output enable signal DOUT_EN is enabled, the data DATA may be transferred from the memory groups 300 to the memory controller 15 through the first path P1. In addition, in case the data input enable signal DIN_EN is enabled, the data DATA may be transferred from the memory controller 15 to the memory groups 300 through the second path P2.

Figure 15:
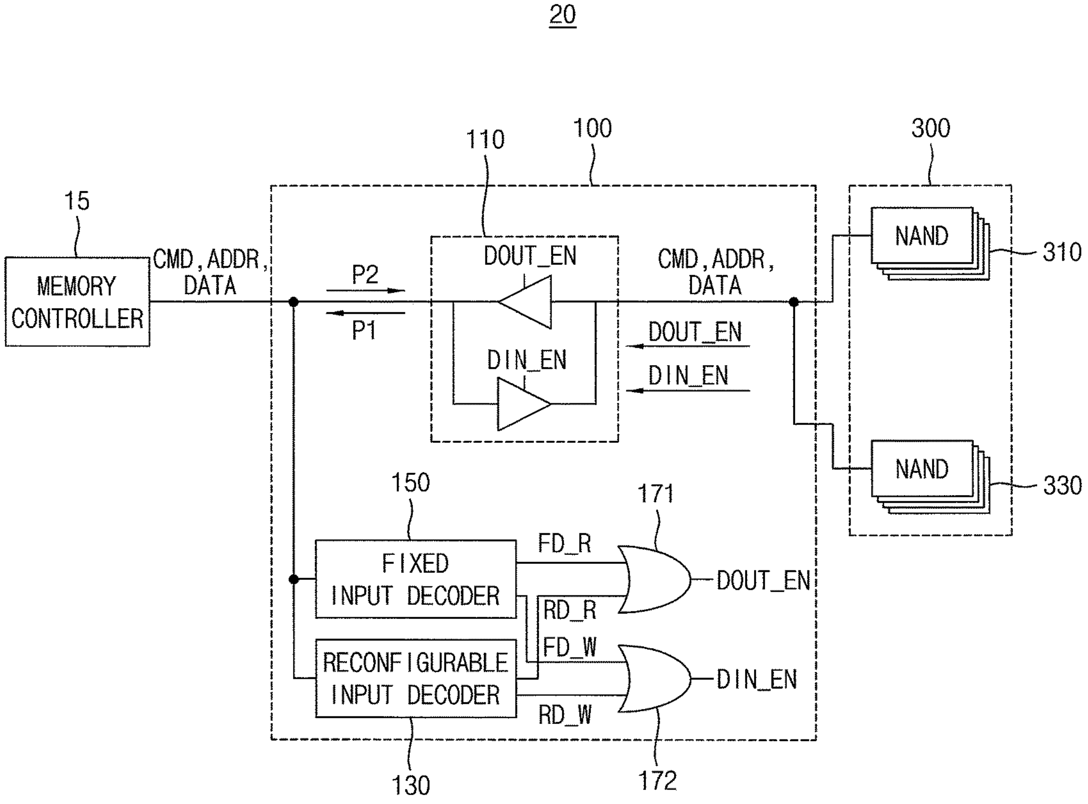
FIG. 15 is a diagram illustrating a memory system according to example embodiments.

FIG. 15 is a diagram illustrating a memory system according to example embodiments.

Referring to FIG. 15, a memory system 20 includes a memory controller 15 and a memory device 10. The memory device 10 includes memory groups 300 and a boosting interface 100. The boosting interface 100 includes a fixed input decoder 150 and a reconfigurable input decoder 130. The memory controller 15 provides a command CMD, data DATA and an access address ADDR. The memory groups 300 store data DATA. The memory groups 300 may include a three-dimensional memory cell array. For example the memory groups 300 may include a first memory group 310 and a second memory group 330. The first memory group 310 may include a plurality of memory cell arrays and the second memory group 330 may include a plurality of memory cell arrays. The plurality of memory cell arrays may include flash memory cells.

The fixed input decoder 150 may include a hard wired circuit 151, as illustrated in FIG. 5, where a fixed command F_CMD is implemented as hardware. For example, the fixed command F_CMD may include a first command CMD1, a second command CMD2 and a third command CMD3. The first command CMD1 may be implemented in the hard wired circuit 151 as hardware. Because the first command CMD1 is implemented in the hard wired circuit 151 as hardware, the first command CMD1 included in the fixed input decoder 150 may not be reprogrammed. In addition, the second command CMD2 may be implemented in the hard wired circuit 151 as hardware. Because the second command CMD2 is implemented in the hard wired circuit 151 as hardware, the second command CMD2 included in the fixed input decoder 150 may not be reprogrammed. In addition, the third command CMD3 may be implemented in the hard wired circuit 151 as hardware. Because the third command CMD3 is implemented in the hard wired circuit 151 as hardware, the third command CMD3 included in the fixed input decoder 150 may not be reprogrammed.

A program command P_CMD of the command CMD is programmed in the reconfigurable input decoder 130 based on a command set mode CSMS and an input-output set mode IOM. For example, a memory controller 15 may provide the command set mode CSMS and the input-output set mode IOM. In case the memory controller 15 provides the command set mode CSMS and the input-output set mode IOM, the memory controller 15 may program the program command P_CMD in the reconfigurable input decoder 130.

The reconfigurable input decoder 130 may include a write command decoder 131, as illustrated in FIG. 6, and a read command decoder 136, as illustrated in FIG. 7. The write command decoder 131 may be programmed by a write command CMD_W of the program command P_CMD when the input-output set mode IOM is an input mode IN_M. For example, the memory controller 15 may provide the command set mode CSMS. After the memory controller 15 provides the command set mode CSMS, the memory controller 15 may provide the input-output set mode IOM. In case the input-output set mode IOM is the input mode IN_M, the write command decoder 131 may be programmed by a write command CMD_W of the program command P_CMD.

The program command P_CMD may be the command CMD that is programmed in the reconfigurable input decoder 130. The write command CMD_W may be used for the write operation of the memory device 10. For example, the write command CMD_W of the program command P_CMD may include the first write command CMD_W1, the second write command CMD_W2 and the third write command CMD_W3. The memory controller 15 may provide the command set mode CSMS. After the memory controller 15 provides the command set mode CSMS, the memory controller 15 may provide the input-output set mode IOM. In case the input-output set mode IOM is the input mode IN_M, the write command decoder 131 may be programmed by the first write command CMD_W1 of the program command P_CMD. After that, the memory controller 15 may provide the command set mode CSMS again. After the memory controller 15 provides the command set mode CSMS, the memory controller 15 may provide the input-output set mode IOM. In case the input-output set mode IOM is the input mode IN_M, the write command decoder 131 may be programmed by the second write command CMD_W2 of the program command P_CMD. After that, the memory controller 15 may provide the command set mode CSMS again. After the memory controller 15 provides the command set mode CSMS, the memory controller 15 may provide the input-output set mode IOM. In case the input-output set mode IOM is the input mode IN_M, the write command decoder 131 may be programmed by the third write command CMD_W3 of the program command P_CMD.

While the memory device 10 operates, an addition of a new command CMD may be required. In case the addition of the new command CMD is required during the operation of the memory device 10, the memory controller 15 may program the program command P_CMD in the reconfigurable input decoder 130 based on the command set mode CSMS and the input-output set mode IOM.

The read command decoder 136 may be programmed by a read command CMD_R of the program command P_CMD when the input-output set mode IOM is an output mode OUT_M. For example, the memory controller 15 may provide the command set mode CSMS. After the memory controller 15 provides the command set mode CSMS, the memory controller 15 may provide the input-output set mode IOM. In case the input-output set mode IOM is the output mode OUT_M, the read command decoder 136 may be programmed by a read command CMD_R of the program command P_CMD.

The program command P_CMD may be the command CMD that is programmed in the reconfigurable input decoder 130. The read command CMD_R may be used for the read operation of the memory device 10. For example, the read command CMD_R of the program command P_CMD may include the first read command CMD_R1, the second read command CMD_R2 and the third read command CMD_R3. The memory controller 15 may provide the command set mode CSMS. After the memory controller 15 provides the command set mode CSMS, the memory controller 15 may provide the input-output set mode IOM. In case the input-output set mode IOM is the output mode OUT_M, the read command decoder 136 may be programmed by the first read command CMD_R1 of the program command P_CMD. After that, the memory controller 15 may provide the command set mode CSMS again. After the memory controller 15 provides the command set mode CSMS, the memory controller 15 may provide the input-output set mode IOM. In case the input-output set mode IOM is the output mode OUT_M, the read command decoder 136 may be programmed by the second read command CMD_R2 of the program command P_CMD. After the memory controller 15 provides the command set mode CSMS, the memory controller 15 may provide the input-output set mode IOM. In case the input-output set mode IOM is the output mode OUT_M, the read command decoder 136 may be programmed by the third read command CMD_R3 of the program command P_CMD.

While the memory device 10 operates, the addition of the new command CMD may be required. In case the addition of the new command CMD is required during the operation of the memory device 10, the memory controller 15 may program the program command P_CMD in the reconfigurable input decoder 130 based on the command set mode CSMS and the input-output set mode IOM. The memory device 10 according to example embodiments may increase performance by programming the program command P_CMD in the reconfigurable input decoder 130 based on the command set mode CSMS and the input-output set mode IOM.

Figure 16:
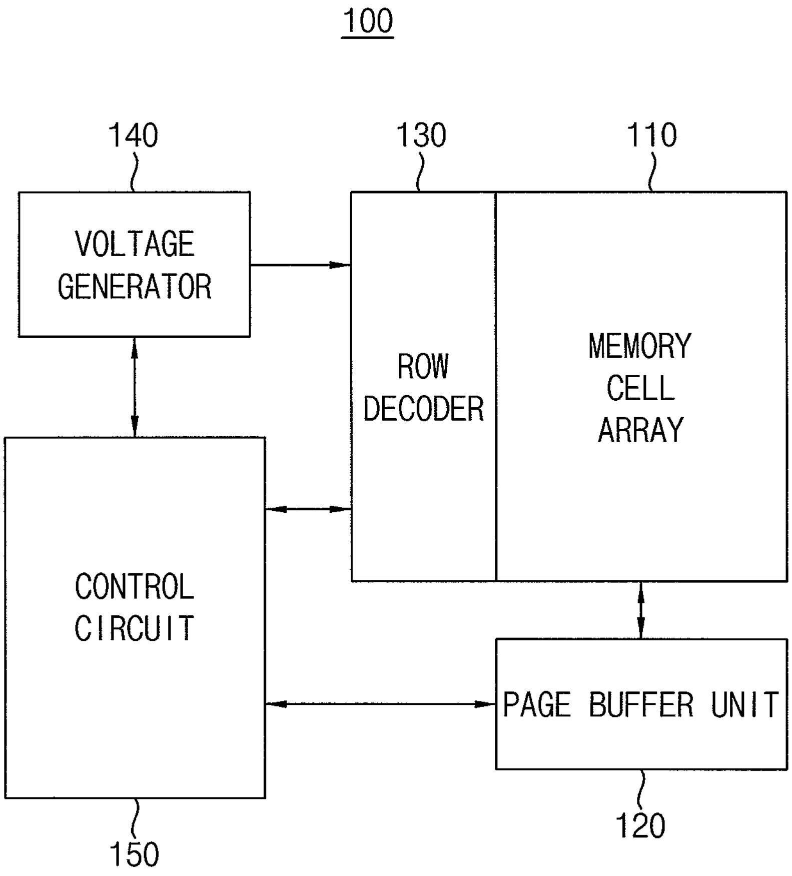
FIG. 16 is a block diagram illustrating a memory device included in the memory system of FIG. 15.

FIG. 16 is a block diagram illustrating a memory device included in the memory system of FIG. 15.

Referring to FIG. 16, a nonvolatile memory device 100 may be a flash memory device. The nonvolatile memory device 100 comprises a memory cell array 110, a page buffer unit 120, a row decoder 130, a voltage generator 140, and a control circuit 150.

Memory cell array 110 comprises multiple memory cells connected to multiple word lines and multiple bit lines, respectively. The memory cells may be NAND or NOR flash memory cells and may be arranged in a two or three dimensional array structure.

In some embodiments, the memory cells may be single level cells (SLCs) or multi-level cells (MLCs). In embodiments including MLCs, a program scheme in a write mode may be, for instance, a shadow program scheme, a reprogrammable scheme, or an on-chip buffered program scheme.

Page buffer unit 120 is connected to the bit lines and stores write data programmed in memory cell array 110 or read data sensed from memory cell array 110. In other words, page buffer unit 120 may be operated as a write driver or a sensing amplifier according to an operation mode of flash memory device 100. For example, page buffer unit 120 may be operated as the write driver in the write mode and as the sensing amplifier in the read mode.

Row decoder 130 is connected to the word lines and selects at least one of the word lines in response to a row address. Voltage generator 140 generates word line voltages such as a program voltage, a pass voltage, a verification voltage, an erase voltage EV and a read voltage according to a control of control circuit 150. Control circuit 150 controls page buffer unit 120, row decoder 130 and voltage generator 140 to perform program, erase, and read operations on memory cell array 110.

Figure 17:
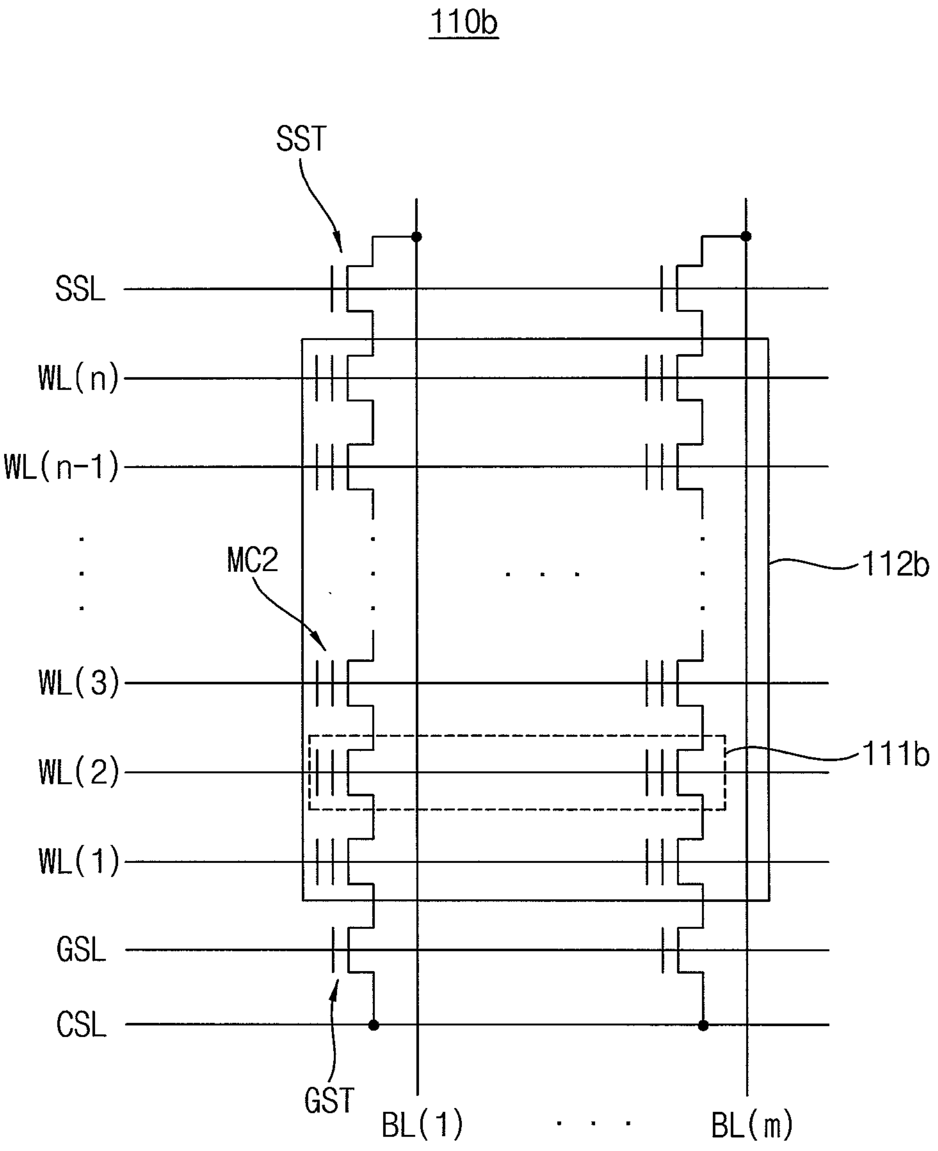
FIG. 17 is a diagram illustrating an example of a memory cell array included in the memory device of FIG. 16.

FIG. 17 is a diagram illustrating an example of a memory cell array included in the memory device of FIG. 16.

Referring to FIG. 17, memory cell array 110*b* comprises string selection transistors SST, ground selection transistors GST and memory cells MC2. String selection transistors SST are connected to bit lines BL(1), . . . , BL(m), and ground selection transistors GST are connected to common source line CSL. Memory cells MC2 disposed in the same column are disposed in series between one of bit lines BL(1), . . . , BL(m) and common source line CSL, and memory cells MCs disposed in the same row are connected in common to one of word lines WL(1), WL(2), WL(3), . . . , WL(n−1), WL(n). That is, memory cells MC2 are connected in series between string selection transistors SST and ground selection transistors GST, and the word lines WL(1), WL(2), WL(3), . . . , WL(n−1), WL(n) are disposed between string selection line SSL and ground selection line GSL.

String selection transistors SST are connected to string selection line SSL such that string selection transistors SST may be controlled according to a level of the voltage applied from string selection line SSL thereto. Memory cells MC2 may be controlled according to a level of a voltage applied to word lines WL(1), . . . , WL(n).

The NAND flash memory device comprising memory cell array 110*b* performs write and read operations in units of page 111*b*, and it performs erase operations in units of block 112*b*. Meanwhile, according to some embodiments, each of the page buffers may be connected to even and odd bit lines one by one. In this case, the even bit lines form an even page, the odd bit lines form an odd page, and the even and odd pages may perform by turns and sequentially the write operation into memory cells MC2.

Figure 18:
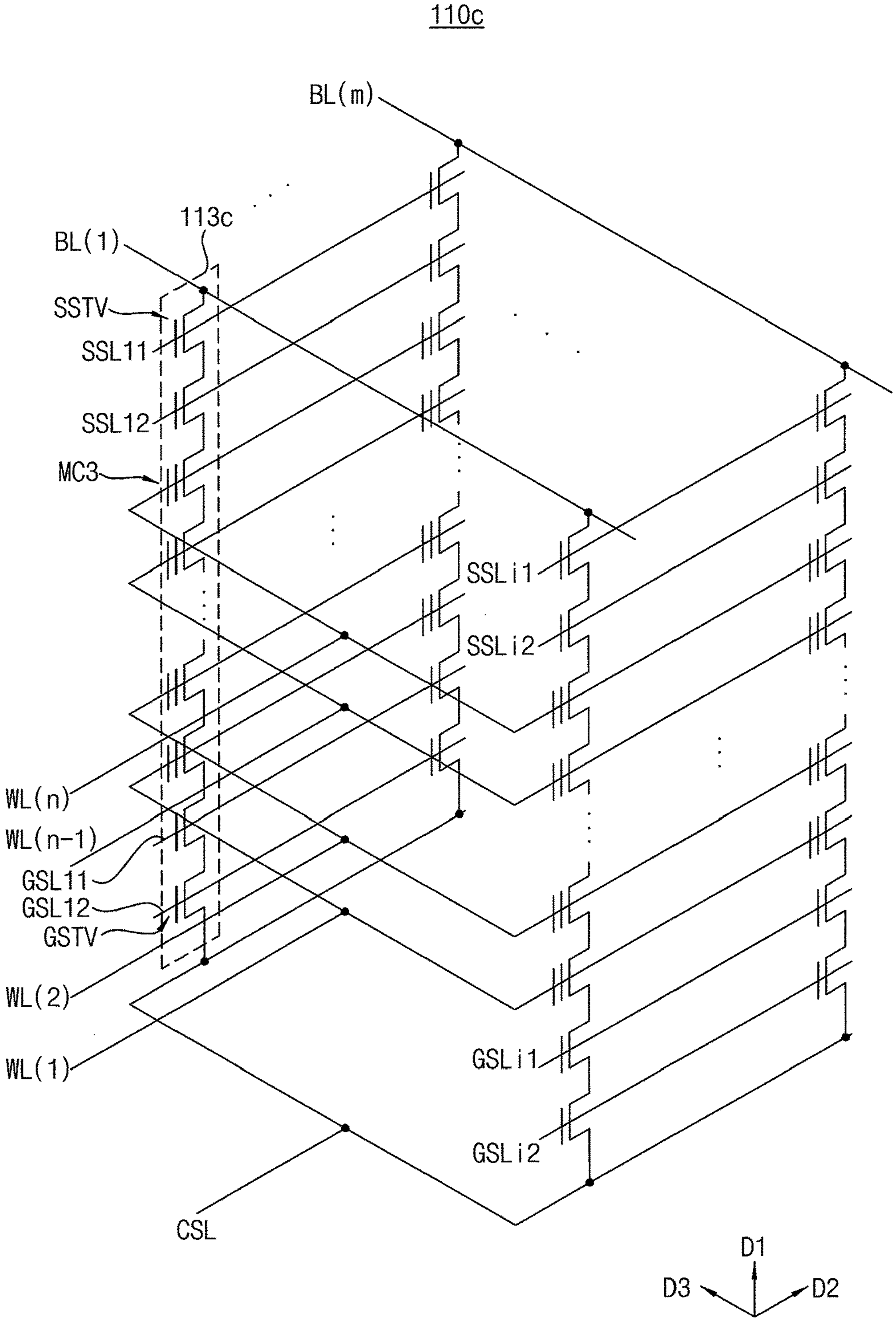
FIG. 18 is a diagram illustrating another example of a memory cell array included in the memory device of FIG. 16.

FIG. 18 is a diagram illustrating another example of a memory cell array included in the memory device of FIG. 16.

Referring to FIG. 18, memory cell array 110*c* comprises multiple strings 113*c* having a vertical structure. Strings 113*c* are formed in the second direction D2 to form a string row. Multiple string rows are formed in the third direction D3 to form a string array. Each of strings 113*c* comprises ground selection transistors GSTV, memory cells MC3, and string selection transistors SSTV, which are disposed in series in the first direction D1 between bit lines BL(1), . . . , BL(m) and common source line CSL.

Ground selection transistors GSTV are connected to ground selection lines GSL11, GSL12, . . . , GSLi1, GSLi2, respectively, and string selection transistors SSTV are connected to string selection lines SSL11, SSL12, . . . , SSLi1, SSLi2, respectively. Memory cells MC3 disposed in the same layer are connected in common to one of word lines WL(1), WL(2), . . . , WL(n−1), WL(n). Ground selection lines GSL11, . . . , GSLi2 and string selection lines SSL11, . . . , SSLi2 extend in the second direction and are formed along the third direction. Word lines WL(1), . . . , WL(n) extend in the second direction and are formed along the first and third directions. Bit lines BL(1), . . . , BL(m) extend in the third direction and are formed along the second direction. Memory cells MC3 are controlled according to a level of a voltage applied to word lines WL(1), . . . , WL(n).

Because the vertical flash memory device comprising memory cell array 110*c* comprises NAND flash memory cells, like the NAND flash memory device, the vertical flash memory device performs the write and read operations in units of pages and the erase operation in units of block.

In some embodiments, two string selection transistors in one string 113*c* are connected to one string selection line and two ground selection transistors in one string are connected to one ground selection line. Further, according to some embodiments, one string comprises one string selection transistor and one ground selection transistor.

In an example embodiment, the memory cell array 110C may be a three dimensional memory array. In addition, in an embodiment of the present disclosure, a three dimensional (3D) memory array is provided in the memory device 10. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. The following patent documents, which are hereby incorporated by reference, describe suitable configurations for the 3D memory arrays, in which the three-dimensional memory array is configured as a plurality of levels, with word-lines WL and/or bit-lines BL shared between levels: U.S. Pat. Nos. 7,679,133; 8,553,466; 8,654,587; 8,559,235; and US Pat. Pub. No. 2011/0233648.

Figure 19:
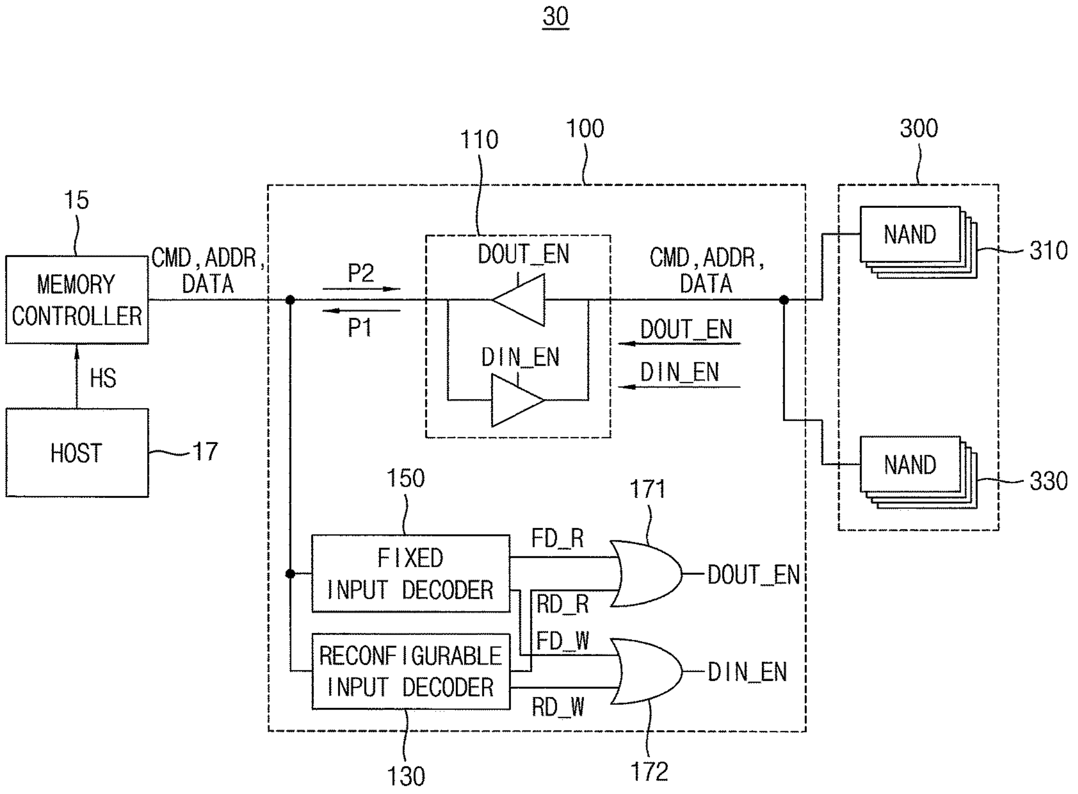
FIG. 19 is a diagram illustrating a computing system according to example embodiments.

FIG. 19 is a diagram illustrating a computing system according to example embodiments.

Referring to FIG. 19, a computing system 30 includes a host 17, a memory controller 15 and a memory device 10. The memory device 10 includes memory groups 300 and a boosting interface 100. The boosting interface 100 includes a reconfigurable input decoder 130. The host 17 may provide a host signal HS. The memory controller 15 may provide the command CMD and the access address ADDR based on the host signal HS. The memory groups 300 store data DATA. The boosting interface 100 transfers the data DATA by determining a transfer path of the data DATA based on a command CMD and an access address ADDR. A program command P_CMD of the command CMD is programmed in the reconfigurable input decoder 130 based on a command set mode CSMS and an input-output set mode IOM. The memory device 10 according to example embodiments may increase performance by programming the program command P_CMD in the reconfigurable input decoder 130 based on the command set mode CSMS and the input-output set mode IOM.

Figure 20:
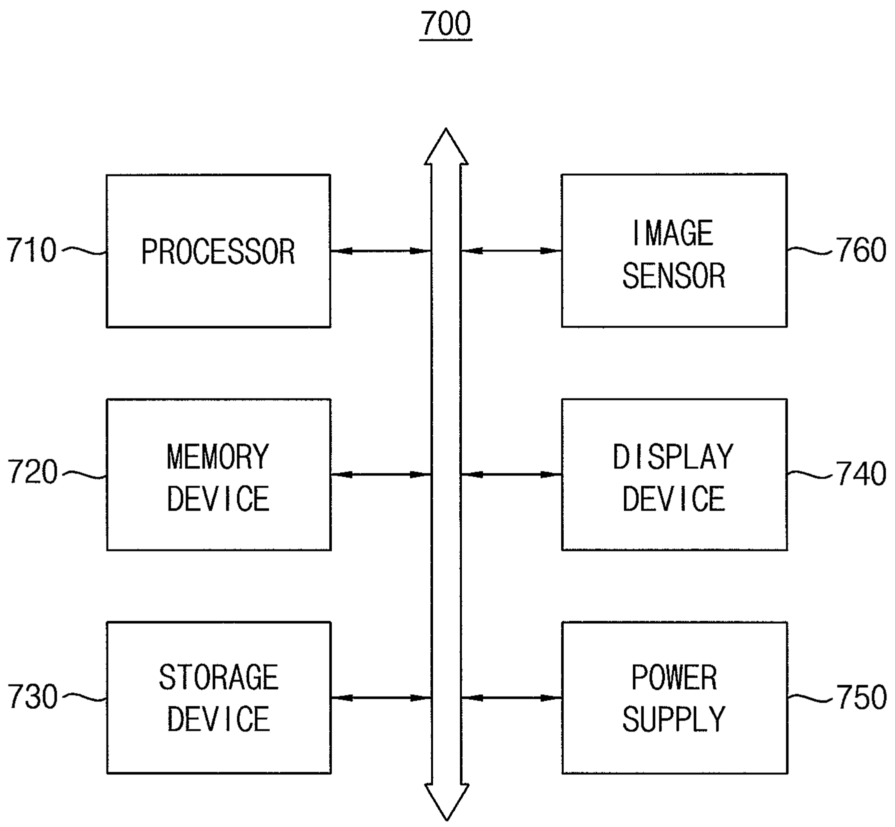
FIG. 20 is a block diagram illustrating a mobile device including the memory device according to example embodiments.

FIG. 20 is a block diagram illustrating a mobile device including the memory device according to example embodiments.

Referring to FIG. 20, a computing system 700 may include a processor 710, a memory device 720, a storage device 730, a display device 740, a power supply 750 and an image sensor 760. The computing system 700 may further include ports that communicate with a video card, a sound card, a memory card, a USB device, other electronic devices, etc.

The processor 710 may perform various calculations or tasks. According to embodiments, the processor 710 may be a microprocessor or a CPU. The processor 710 may communicate with the memory device 720, the storage device 730, and the display device 740 via an address bus, a control bus, and/or a data bus. In some embodiments, the processor 710 may be coupled to an extended bus, such as a peripheral component interconnection (PCI) bus. The memory device 720 may store data for operating the computing system 700. For example, the memory device 720 may be implemented with a dynamic random access memory (DRAM) device, a mobile DRAM device, a static random access memory (SRAM) device, a phase-change random access memory (PRAM) device, a ferroelectric random access memory (FRAM) device, a resistive random access memory (RRAM) device, and/or a magnetic random access memory (MRAM) device. The memory device 720 includes the data loading circuit according to example embodiments. The storage device 730 may include a solid state drive (SSD), a hard disk drive (HDD), a CD-ROM, etc. The computing system 700 may further include an input device such as a touchscreen, a keyboard, a keypad, a mouse, etc., and an output device such as a printer, a display device, etc. The power supply 750 supplies operation voltages for the computing system 700.

The image sensor 760 may communicate with the processor 710 via the buses or other communication links. The image sensor 760 may be integrated with the processor 710 in one chip, or the image sensor 760 and the processor 710 may be implemented as separate chips.

At least a portion of the computing system 700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP). The computing system 700 may be a digital camera, a mobile phone, a smart phone, a portable multimedia player (PMP), a personal digital assistant (PDA), a computer, etc.

Figure 21:
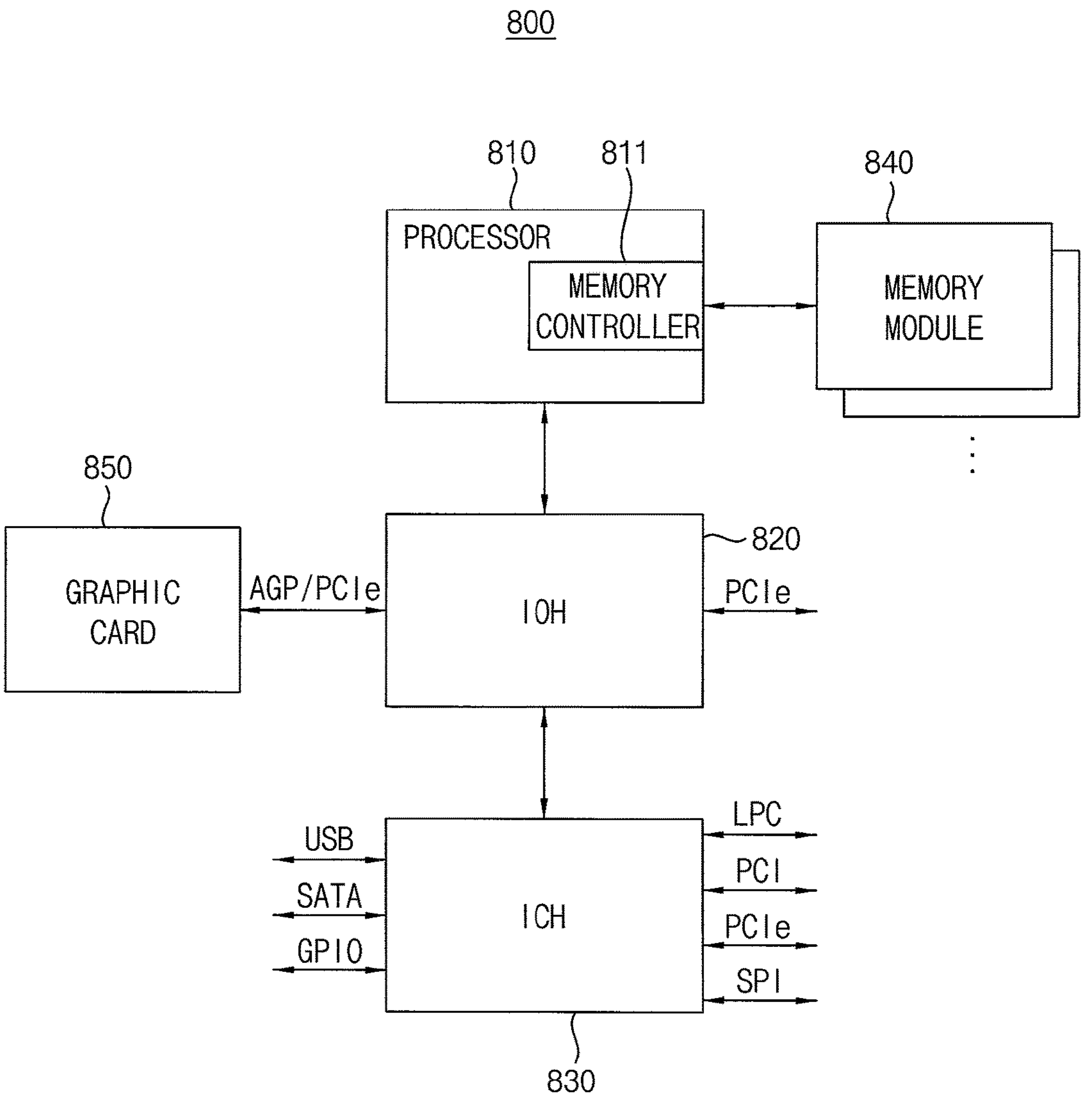
FIG. 21 is a block diagram illustrating a computing system including the memory device according to example embodiments.

FIG. 21 is a block diagram illustrating a computing system including the memory device according to example embodiments.

Referring to FIG. 21, a computing system 800 includes a processor 810, an input/output hub (IOH) 820, an input/output controller hub (ICH) 830, at least one memory module 840 and a graphics card 850. In some embodiments, the computing system 800 may be a personal computer (PC), a server computer, a workstation, a laptop computer, a mobile phone, a smart phone, a personal digital assistant (PDA), a portable multimedia player (PMP), a digital camera, a digital television, a set-top box, a music player, a portable game console, a navigation system, etc.

The processor 810 may perform various computing functions, such as executing specific software for performing specific calculations or tasks. For example, the processor 810 may be a microprocessor, a central process unit (CPU), a digital signal processor, or the like. In some embodiments, the processor 810 may include a single core or multiple cores. For example, the processor 810 may be a multi-core processor, such as a dual-core processor, a quad-core processor, a hexa-core processor, etc. Although FIG. 21 illustrates the computing system 800 including one processor 810, in some embodiments, the computing system 800 may include a plurality of processors. The processor 810 may include an internal or external cache memory.

The processor 810 may include a memory controller 811 for controlling operations of the memory module 840. The memory controller 811 included in the processor 810 may be referred to as an integrated memory controller (IMC). A memory interface between the memory controller 811 and the memory module 840 may be implemented with a single channel including a plurality of signal lines, or may be implemented with multiple channels, to each of which at least one memory module 840 may be coupled. In some embodiments, the memory controller 811 may be located inside the input/output hub 820, which may be referred to as memory controller hub (MCH).

The memory module 840 may include a plurality of memory devices that store data provided from the memory controller 811 and a buffer chip that manages overall operation of the memory devices. Each of the memory devices may store data processed by the CPU 810, or may operate as a working memory. Each of the memory devices may be a dynamic random access memory, such as DDR SDRAM, LPDDR SDRAM, GDDR SDRAM, RDRAM, etc. The buffer chip manages operation of the memory devices.

The input/output hub 820 may manage data transfer between processor 810 and devices, such as the graphics card 850. The input/output hub 820 may be coupled to the processor 810 via various interfaces. For example, the interface between the processor 810 and the input/output hub 820 may be a front side bus (FSB), a system bus, a HyperTransport, a lightning data transport (LDT), a QuickPath interconnect (QPI), a common system interface (CSI), etc. Although FIG. 21 illustrates the computing system 800 including one input/output hub 820, in some embodiments, the computing system 800 may include a plurality of input/output hubs. The input/output hub 820 may provide various interfaces with the devices. For example, the input/output hub 820 may provide an accelerated graphics port (AGP) interface, a peripheral component interface-express (PCIe), a communications streaming architecture (CSA) interface, etc.

The graphics card 850 may be coupled to the input/output hub 820 via AGP or PCIe. The graphics card 850 may control a display device (not illustrated) for displaying an image. The graphics card 850 may include an internal processor for processing image data and an internal memory device. In some embodiments, the input/output hub 820 may include an internal graphics device along with or instead of the graphics card 850. The graphics device included in the input/output hub 820 may be referred to as integrated graphics. Further, the input/output hub 820 including the internal memory controller and the internal graphics device may be referred to as a graphics and memory controller hub (GMCH).

The input/output controller hub 830 may perform data buffering and interface arbitration to efficiently operate various system interfaces. The input/output controller hub 830 may be coupled to the input/output hub 820 via an internal bus, such as a direct media interface (DMI), a hub interface, an enterprise Southbridge interface (ESI), PCIe, etc. The input/output controller hub 830 may provide various interfaces with peripheral devices. For example, the input/output controller hub 830 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In some embodiments, the processor 810, the input/output hub 820 and the input/output controller hub 830 may be implemented as separate chipsets or separate integrated circuits. In other embodiments, at least two of the processor 810, the input/output hub 820 and the input/output controller hub 830 may be implemented as a single chipset.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of exemplary embodiments of the disclosure. Accordingly, all such modifications are intended to be included within the scope of the disclosure as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A memory device comprising:

memory groups configured to store data; and a boosting interface configured to transfer the data by determining a transfer path of the data based on a command and an access address received from a memory controller, the boosting interface comprising a buffer and a reconfigurable input decoder in which a program command is programmed based on a command set mode and an input-output set mode received from the memory controller, wherein:

the reconfigurable input decoder instructs the buffer to communicate the data between the memory groups and the memory controller in response to determining that the program command, which is programmed in the reconfigurable input decoder, corresponds to the command received from the memory controller, and the reconfigurable input decoder includes:

a write command decoder in which a write command of the program command is programmed when the input-output set mode is an input mode, and a read command decoder in which a read command of the program command is programmed when the input-output set mode is an output mode.

2. The memory device of claim 1, wherein the boosting interface further comprises a fixed input decoder having a hard-wired circuit in which a fixed command is implemented through hardware.

3. The memory device of claim 1, wherein the write command decoder includes:

a write latch in which the write command is programmed; and a write comparator configured to provide a write comparison signal by comparing the write command that is programmed in the write latch and the command that is provided from the memory controller.

4. The memory device of claim 3, wherein, when the memory controller provides the command set mode and the input mode of the input-output set mode, the write command is programmed in the write latch.

5. The memory device of claim 4, wherein an enable bit is further programmed in the write latch, the enable bit determining whether the write command programmed in the write latch is activated or not.

6. The memory device of claim 5, wherein:

the buffer is configured to transfer the data between the memory groups and the memory controller based on a data output enable signal and a data input enable signal, when the enable bit is a first state and the write comparison signal is a first state, the data input enable signal is activated, when the enable bit is a second state, the data input enable signal is deactivated, and when the write comparison signal is a second state, the data input enable signal is deactivated.

7. The memory device of claim 1, wherein the boosting interface further includes an anti-fuse that stores the program command.

8. The memory device of claim 7, wherein, when the memory device is powered-on, the program command that is stored in the anti-fuse is programmed in the reconfigurable input decoder.

9. The memory device of claim 1, wherein the read command decoder includes:

a read latch in which the read command is programmed; and a read comparator configured to provide a read comparison signal by comparing the read command that is programmed in the read latch and the command that is provided from the memory controller.

10. The memory device of claim 9, wherein, when the memory controller provides the command set mode and the output mode of the input-output set mode, the read command is programmed in the read latch.

11. The memory device of claim 10, wherein an enable bit is further programmed in the read latch, the enable bit determining whether the read command programmed in the read latch is activated or not.

12. The memory device of claim 11, wherein:

the buffer is configured to transfer the data between the memory groups and the memory controller based on a data output enable signal and a data input enable signal, when the enable bit is a first state and the read comparison signal is a first state, the data output enable signal is activated, when the enable bit is a second state, the data output enable signal is deactivated, and when the read comparison signal is a second state, the data output enable signal is deactivated.

13. A memory system comprising:

a memory controller configured to provide a command and an access address;

memory groups configured to store data; and a boosting interface configured to transfer the data by determining a transfer path of the data based on the command and the access address received from the memory controller, the boosting interface comprising a buffer and a reconfigurable input decoder in which a program command is programmed based on a command set mode and an input-output set mode received from the memory controller, wherein:

the reconfigurable input decoder instructs the buffer to communicate the data between the memory groups and the memory controller in response to determining that the program command, which is programmed in the reconfigurable input decoder, corresponds to the command received from the memory controller, and the reconfigurable input decoder includes:

a write command decoder in which a write command of the program command is programmed when the input-output set mode is an input mode, and a read command decoder in which a read command of the program command is programmed when the input-output set mode is an output mode.

14. The memory system of claim 13, wherein the memory groups include a three-dimensional memory cell array.

* * * * *